United States Patent [19]

Fogg

[11] Patent Number: 5,990,185
[45] Date of Patent: Nov. 23, 1999

[54] POLYMER POLYOL AND PREFORMED STABILIZER SYSTEMS

[75] Inventor: Graeme Douglas Fogg, Vogelwaarde, Netherlands

[73] Assignee: The Dow Chemical Company, Midland, Mich.

[21] Appl. No.: 09/043,557

[22] PCT Filed: Oct. 23, 1995

[86] PCT No.: PCT/EP95/04149

§ 371 Date: Mar. 19, 1998

§ 102(e) Date: Mar. 19, 1998

[87] PCT Pub. No.: WO97/15605

PCT Pub. Date: May 1, 1997

[51] Int. Cl.⁶ ........................................... C08J 9/00
[52] U.S. Cl. ................ 521/112; 528/21; 528/24; 524/730; 526/279
[58] Field of Search ............... 522/99, 172, 136, 522/137, 145; 528/21, 24; 556/444; 526/279; 524/730; 521/112

[56] References Cited

U.S. PATENT DOCUMENTS 4,723,026  2/1988  Cloetens et al. .................. 556/444
4,831,076  5/1989  Lidy et al. ........................ 524/701
4,883,832  11/1989  Cloetens et al. .................. 524/265

*Primary Examiner*—Melvyn I. Marquis
*Assistant Examiner*—Mark W. Milstead

[57] ABSTRACT

A preformed stabilizer composition based on a precursor stabilizer obtainable by reacting a silicon atom containing compound of formula $R_nSiX_{4-n}$ or $R_nSi((-OSi(R^1)_2)_pX)_{4-n}$ wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with a polyether polyol having an average molecular weight in excess of 400 and a hydroxyl number in the range 20 to 280 is used to manufacture polymer polyol compositions having a combination of (a) high polymer content, from 30 weight percent to 60 weight percent, (b) lower viscosities, typically less than 9,000 centipose, (c) product stability such that 100% passes through a 150 mesh screen, and (d) up to 100% of the polymer solids content passes through a 700 mesh screen.

8 Claims, No Drawings

POLYMER POLYOL AND PREFORMED STABILIZER SYSTEMS

The present invention relates to a polymer polyols and a process for the preparation thereof, and preformed stabilizer used for the preparation of polymer polyols.

Polymer polyols suitable for the preparation of polyurethane foams and elastomers are well known and are widely used on commercial scale. Polyurethane foams made from polymer polyols have a wide variety of uses. The two major types of polyurethane foams are slabstock and moulded foam. Polyurethane slabstock foams are used in carpet, furniture and bedding applications. Moulded polyurethane foams are used in the automotive industry for variety of applications.

Polymer polyols are produced by polymerizing one or more ethylenically unsaturated monomers dissolved or dispersed in a polyol in the presence of a free radical catalyst to form a stable dispersion of a polymer particles in the polyol. Initially, polymer polyols producing polyurethane foams having higher load-bearing properties than those produced from unmodified polyols were prepared using acrylonitrile monomer; however, many of these polymer polyols had undesirably high viscosity.

Presently, polyurethane foams having high load-bearing properties are predominantly produced using polymer polyols which are prepared using a high styrene content monomer mixture (e.g., 65 to 75 percent styrene). However, polymer polyols produced from such high styrene monomer mixture often do not satisfy the ever-increasing industry needs, including acceptable viscosity, strict stability requirements and increased load-bearing properties.

Stability and low viscosity of polymer polyols is of increasing importance to polyurethane foam manufacturers due development of sophisticated, high speed and large volume equipment and systems for handling, mixing and reacting polyurethane-forming ingredients. Polymer polyols must meet certain minimum polymer particles size requirements to avoid filters, pumps and other parts of such foam processing equipment becoming plugged or fouled in relatively short periods of time, Numerous attempts have been made to produce polymer polyols which will meet foam processing and load-bearing properties required by polyurethane foam industry.

U.S. Pat. No. 4,242,249 (Van Cleve et al) describes polymer polyols prepared by using certain preformed dispersants or stabilizers. These polymer polyols provide stability satisfactory for commercial production, and use of at least one of (i) high amounts of styrene or other comonomer with acrylonitrile, (ii) higher solids contents or (iii) the use of lower molecular weight polyols. The particular stabilizer used and the concentration used vary with respect to the monomer system used in the preparation of polymer polyols.

U.S. Pat. No. 4,652,589 (Simroth et al) describes stabilizer precursors for polymer polyols. Stabilizer A is made by reacting a 34 hydroxyl number, 15 weight percent ethylene oxide capped polyoxypropylene triol with maleic anhydride and subsequently with ethylene oxide. Stabilizer A has a hydroxyl number of 32, an unsaturation of 0.1 meq/g, with the unsaturation being 30/70 maleate/fumarate. Stabilizer B is made by reacting a 28 hydroxyl number sorbitol started polyol, containing 10 percent internal ethylene oxide, with maleic anhydride, and subsequently with propylene oxide. Stabilizer B has a hydroxyl number of 28 and an unsaturation of approximately 0.07 meq/g, with the unsaturation being of the fumarate type.

U.S. Pat. No. 5,196,476 (Simroth) describes: (a) a high potency preformed stabilizer; (b) the use of same in the manufacture of polymer polyols having high solids content, lower viscosity and excellent product stability; and (c) a polyurethane made using such polymer polyol. The preformed stabilizer is the free radical polymerization product of at least one free radically polimerizable ethylenically unsaturated monomer and at least one polyhydric alcohol adduct comprising a polyhydric alcohol residue and a residue of a compound having fumaric or maleic type unsaturation.

U.S. Pat. No. 5,364,906 (Critchfield et al) describes a method for producing a stable, low viscosity polymer polyol via a modified seed method by the steps of (1) producing a first reaction product by polymerizing a first feed in a first continuous reactor in the presence of an initiator, the first feed comprising less than 50 weight percent of a total monomer proportion in at least 50 weight percent of a total base polyol proportion, optionally in the presence of a precursor stabilizer which is prepared by reacting a polyol with maleic anhydride; and (2) producing a second reaction product by polymerizing a second feed in a continuous reactor in the presence of an initiator, the second feed comprising (a) the first reaction product, (b) at least 50 weight percent of the total monomer proportion, and (c) any balance of the base polyol proportion.

European Patent No. 0 162 589 B1 (Cloetens et al) describes a nonaqueous dispersion stabilizer which is the reaction product of a polyether polyol having an average molecular weight greater than 400 and a hydroxyl number in the range of 20 to 280 with silicon atom containing compound having at least least one olefinically unsaturated functional group and at least one functional group attached to the silicon atom which is reactable with the hydroxyl groups on the polyether polyol.

Additional prior art of interest include U.S. Pat. No. Re. 32,733 (Simroth et al); U.S. Pat. No. 3,931,092 (Ramlow et al); U.S. Pat. No. 4,014,846 (Ramlow et al)); U.S. Pat. No. 4,093,573 (Ramlow et al); U.S. Pat. No. 4,148,840 (Shah); U.S. Pat. No. 4,172,825 (Shook et al); U.S. Pat. No. 4,342, 840 (Kozawa et al); U.S. Pat. No. 4,390,645 (Hoffman et al); U.S. Pat. No. 5,394,491 (Hoffman); U.S. Pat. No. 4,454,255 (Ramlow et al); U.S. Pat. No. 4,458,038 (Ramlow et al); and U.S. Pat. No. 4,745,153 (Hoffman).

Although there has been progress in reduction of viscosity and increased in solids content of polymer polyols, there is still a need for polymer polyols having improved processing and load-bearing properties and for alternate method for making same.

The present invention is directed to a preformed stabilizer composition and to the manufacture of polymer polyols therewith which polymer polyols possess a combination of (a) high polymer content, from 30 weight percent to 60 weight percent, (b) lower viscosities, typically less than 9,000 centipose, (c) product stability such that 100% passes through a 150 mesh screen, and (d) up to 100% of the polymer solids content passes through a 700 mesh screen.

In one aspect, the present invention concerns a preformed stabilizer composition for use in the preparation of polymer polyols comprising the reaction product of (i) a polyol;

(ii) a precursor stabilizer obtainable by reacting a silicon atom containing compound of formula

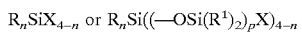

$$R_nSiX_{4-n} \text{ or } R_nSi((-OSi(R^1)_2)_pX)_{4-n}$$

wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with a polyether polyol having an average molecular weight in excess of 400 and a hydroxyl number in the range 20 to 280;

(iii) at least one ethylenically unsaturated monomer which is copolymerizable with the precursor stabilizer; and (iv) a free radical polymerization initiator.

In another aspect, the present invention concerns a process for the preparation of the preformed stabilizer composition which process comprises providing above mentioned composition components (i), (ii), (iii) and (iv) in a reaction zone maintained at a temperature sufficient to initiate a free radical polymerization, and under sufficient pressure to maintain only liquid phases in the reaction zone, for a period of time sufficient to react essentially all the precursor stabilizer and recovering a heterogenous mixture containing the preformed stabilizer composition.

In another aspect, the present invention concerns a polymer polyol composition which has a polymer content of 30 to 60 weight percent, based on total weight, a viscosity in centipose of not more than 8,000 and product stability such that essentially 100% passes through a 150 mesh screen and up to 100% passes through a 700 mesh screen produced by a free radical polymerization of the composition comprising:

(a) a polyol;

(b) the above preformed stabilizer composition;

(c) at least one ethylenically unsaturated monomer;

(d) a free radical polymerization initiator; and, optionally, (e) a chain transfer agent.

In another aspect, the present invention concerns a process for the preparation of a polymer polyol composition which process comprises providing above mentioned polymer polyol forming composition components (a), (b), (c) and (d) in a reaction zone maintained at a temperature sufficient to initiate a free radical polymerization, and under sufficient pressure to maintain only liquid phases in the reaction zone, for a period of time sufficient to react a major portion of the ethylenically unsaturated monomer to for a heterogenous mixture containing the polymer polyol and recovering recovering same from this heterogenous mixture.

Yet in another aspect, the present invention concerns a polymer polyol composition which possesses a polymer content of 30 to 60 weight percent, based on total weight, a viscosity in centipose of no more than 8,000 and product stability such that essentially 100% passes through a 150 mesh screen produced by a free radical polymerization of the above polymer polyol forming composition.

Yet in another aspect, the present invention concerns a polyurethane foam forming composition comprising the above polymer polyol composition, a polyurethane catalyst, an organic polyisocyanate, a silicone surfactant, and a blowing agent Yet in another aspect, the present invention concerns a polyurethane foam made from the above polyurethane foam forming composition.

Precursor stabilizers useful in the present invention are obtained by reacting a silicon atom containing compound of formula

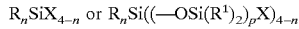

$$R_nSiX_{4-n} \text{ or } R_nSi((-OSi(R^1)_2)_pX)_{4-n}$$

wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with a polyether polyol having an average molecular weight in excess of 400 and a hydroxyl number in the range 20 to 280. The particularly preferred precursor stabilizers are the reaction products of vinyltrimethoxy silane, vinyltriethoxy silane or vinyltripropoxy silane with a polyetherpolyol having an average molecular weight in excess of 400 and a hydroxyl number in the range 20 to 280. These precursor stabilizers and their preparation are described in European Patent No. 0 162 589 B1 (Cloetens et al).

The polyols used in the composition for preparing the preformed stabilizer composition of this invention may be for example polyether polyols, polyhydroxyl containing polyesters, polyhydroxyl terminated polyurethane polymers, polyhydric polythioethers, and polytetrahydrofurans. These polyols are well known and are commercially available. The preferred polyols are the polyether polyols. The polyether polyol used should have a number average molecular weight in excess of 400, preferably from 3,000, more preferably from 5,000 and a hydroxyl number in the range 20 to 280. Most preferably, the polyether polyol should be a poly (oxyethylene) (oxypropylene) adduct of an alcohol selected from glycerol, trimethylolpropane, diethylene glycol, the isomers of butanetriol, pentanetriol and hexanetriol and pentaerythritol, sucrose and sorbitol. A mixture of polyols can be used, if desired. The polyol concentration in the preformed stabilizer forming composition is not critical and can be varied within wide limits. Typically, the concentration can vary from 50 to 90 weight percent or even more, preferably 60 to 70 weight percent, based on the total feed to the reactor. A mixture of various useful polyols can be used, if desired.

Any ethylenically unsaturated monomer which is free radically polymerizable can be used as component (iii) in the preformed stabilizer forming composition of this invention. It is preferred to use vinyl monomers. Styrene, acrylonitrile, methacrylonitrile and methyl methacrylate are preferred vinyl monomers. Most preferred vinyl monomers are styrene, acrylonitrile and mixtures thereof. Typically, a minimum of 2 to 20 percent by weight of an ethylenically unsaturated monomer is used in the preformed stabilizer forming composition. When a mixture of styrene and acrylonitrile is used, the weight proportion of styrene can vary from 20 to 80 weight percent and acrylonitrile can accordingly vary from 80 to 20 weight percent of the mixture. A styrene to acrylonitrile ratio in the monomer mixture of from 80:20 to 20:80 is preferred, with the ratio of from 70:30 to 50:50 being most preferred.

The free radical polymerization initiator useful in the preparation of the preformed stabilizer of this invention can be any compounds which are routinely used to effect grafting of an ethylenically unsaturated polymer to a polyol including peroxides, perborates, persulphates, percarbonates and azo compounds. Typical examples of such free radical initiators include, alkyl and aryl hydroperoxides, dialkyl and diaryl peroxides, dialkylperoxydicarbonates and azobis (nitriles). Preferred free radical initiators are tert-butylperoxy diethyl acetate and tert-butyl peroctoate. The free radical initiator concentration in the preformed stabilizer forming composition is not critical and can be varied within wide limits. Typically, the concentration can vary from 0.01 to 2.0 weight percent or even more, preferably 0.05 to 0.2 weight percent, based on the total feed to the reactor. The particular free radical initiator concentration selected will usually be an optimum value considering all factors, including costs.

Typically, the polyol is used in an amount of from 50 to less 80 weight percent, the precursor stabilizer in an amount of from 10 to less than 50 weight percent, the monomer in an amount of from 5 to 15 weight percent and the free radical polymerization initiate in an amount of from 0.01 to 2 weight percent in the preformed stabilizer forming composition of this invention.

The process for preparing the preformed stabilizer is similar to the process for preparing the polymer polyol. The temperature range is not critical and may vary from 80° C. to 150° C. The preferred temperature range is from 110° C. to 130° C. The mixing conditions used are those obtained using a back mixed reactor. The reactors of this type keep the reaction mixture relatively homogenous and so prevent localized high monomer to precursor stabilizer ratios such as occur in tubular reactors, where all of the monomer is added at the beginning of the reactor.

The present invention also concerns the preparation of stable, high solids polymer polyols compositions which have acceptable viscosities.

The polymer polyol composition of the present invention possesses a polymer content of from 30, preferably 40, most preferably 40 weight percent, to 50 weight percent, the remainder being liquid polyol. Over the range of solids content, it can have a viscosity in centipose less than 9,000. The polymer polyol compositions of the present invention also show exceptional stability such that essentially 100 percent passes through a 150 mesh screen and a significant amounts of high solids content polymer polyol, essentially 100 percent passes through 700 mesh screen. As shown in the examples, polymer polyol compositions having a solids content of 42.2, 45.2, 40.6 and 41.8 percent, with a viscosity of 5550, 6800, 4950 and 3280 centipose, respectively, all passed essentially 100 percent through a 700 mesh screen.

The polymer polyol composition of the present invention is the reaction product of the composition comprising: (a) a polyol; (b) the preformed stabilizer composition of the present invention; (c) at least one ethylenically unsaturated monomer; and (d) a free radical polymerization initiator.

The process for preparing the polymer polyols of the present invention comprises: (1) providing a heterogenous mixture of the preformed stabilizer composition of the present invention in combination with a polyol, at least one free radically polymerizable monomer and a free radical polymerization initiator, in a reaction zone maintained at a temperature sufficient to initiate a free radical polymerization reaction, and under sufficient pressure to maintain only liquid phases in the reaction zone, for a period of time sufficient to react a high proportion of the at least one ethylenically unsaturated monomer, and recovering the resulting polymer polyol.

Any known polyol having a functionality of at least two and a molecular weight in excess of 400, preferably from 1,000 and 15,000, more preferably from 2,00 to 8,000, and a hydroxyl number in the range 20 to 280 can be used for the preparation of polymer polyols of the present invention. These polyols are well known and are available commercially. The same or different polyol as the one used for the preparation of the preformed stabilizer may be used for the preparation of the polymer polyol composition of this invention. Useful polyols may be for example polyether polyols, polyhydroxyl containing polyesters, polyhydroxyl terminated polyurethane polymers, polyhydric polythioethers, and polytetrahydrofurans. The preferred polyols are the polyether polyols. Most preferably, the polyether polyol should be a poly (oxyethylene) (oxypropylene) adduct of an alcohol selected from glycerol, trimethylolpropane, diethylene glycol, the isomers of butanetriol, pentanetriol and hexanetriol and pentaerythritol. The polyol concentration in the polymer polyol forming composition is not critical and can be varied within wide limits. Typically, the concentration can vary from 40 to 80, preferably 45 to 70, more preferably from 50 to 60, weight percent, based on the total feed to the reactor. The particular polyol used will depend on the end use of the polyurethane foam to be produced. A mixture of various useful polyols can be used, if desired.

Any ethylenically unsaturated monomer which is free radically polymerizable can be used as component (iii) in the preformed stabilizer forming composition of this invention. It is preferred to use vinyl monomers. Preferred vinyl monomers are styrene, acrylonitrile, methacrylonitrile and methyl methacrylate. The most preferred vinyl monomers are styrene, acrylonitrile and mixtures thereof. Typically, a minimum of 30 to 60 percent by weight of an ethylenically unsaturated monomer is used in the preformed stabilizer forming composition. When a mixture of styrene and acrylonitrile is used, the weight proportion of styrene can vary from 80 to 20 weight percent and acrylonitrile can accordingly vary from 80 to 20 weight percent of the mixture. A styrene to acrylonitrile ratio in the monomer mixture of from 80:20 to 20:80 is preferred, with the ratio of from 70:30 to 50:50 being most preferred.

The free radical polymerization initiator useful in the preparation of the preformed stabilizer of this invention can be any compounds which are routinely used to effect vinyl polymerization reaction including peroxides, perborates, persulphates, percarbonates and azo compounds. Typical examples of such free radical initiators include, alkyl and aryl hydroperoxides, dialkyl and diaryl peroxides, dialkylperoxydicarbonates and azobis(nitriles). Preferred free radical initiators are 2,2'-azobis(isobutyronitrile) and 2,2'-azobis (methylbutyronitrile). The free radical initiator concentration in the polymer polyol forming composition is not critical and can be varied within wide limits. Typically, the concentration can vary from 0.01 to 5.0 weight percent, preferably 0.01 to 2.0 weight percent, more preferably 0.05 to 0.2 weight percent, based on the total feed to the reactor. The particular free radical initiator concentration selected will usually be an optimum value considering all factors, including costs.

If desired, any known chain transfer agent can be used in the prepolymer stabilizer forming composition of the present invention. Preferred chain transfer agents are monohydroxy alcohols because of their ease of stripping from the final polymer polyol composition. The most preferred chain transfer agent is isopropanol.

The polymer polyol forming composition is provided into the reactor, preferably a continuous, stirred, back-mixed reactor. The internal temperature of the reactor is controlled within a range of from 80° C. to 150° C, preferably 110° C. to 130° C. The contents of the reactor are well mixed with the residence time of at least 5 minutes, preferably preferably from 15 to 45 minutes.

The polymer polyol composition of the present invention is useful in the preparation of polyurethane foams. Such polyurethane foams have improved load-bearing and tensile strength properties without impairment of other physical properties of the foam.

The polyurethane foams are prepared by reacting the polymer polyol composition of the present invention with a polyfunctional organic isocyanate in the presence of a catalyst for the urethane forming reaction, a blowing agent and a foam stabilizer.

Polyfunctional organic isocyanates which can be used for the preparation of the polyurethane foam are well known and are available commercially. Illustrative examples of useful polyfunctional organic isocyanates include the toluene diisocyanates, especially 2,4-and 2,6-toluene diisocyanate (TDI) as well as any desired mixture of these isomers; 2,4'- and 4,4'-diphenylmethane diisocyanate (MDI) as well as any desired mixture of these isomers; oligomers of MDI (polymeric MDI), polymethylene polyphenyl polyisocyanates (commonly referred to as "crude MDI"); mixtures of TDI and polymeric MDI and mixtures of the these polyisocyanates. Prepolymers of the above isocyanate (e.g. with polyether polyols, glycols or mixtures of these) can also be used in the present invention. The preferred isocyanate is 80/20 TDI (a mixture of 80 percent 2,4-toluene diisocyanate and 20 percent 2,6-toluene diisocyanate). Polyfunctional isocyanates are used in amounts well known to skilled persons.

Any of the known blowing agents conventionally used in the production of polyurethane foams can be used. Suitable blowing agents include water and halogenated hydrocarbons of low molecular weight. The blowing agents are used in amounts well known to skilled persons.

Any of the polyurethane catalysts normally used in the preparation of polyurethane foams may be used in the process of the present invention including tertiary amines and organometallic compounds. The polyurethane catalyst is used in amounts well known to skilled persons. Mixtures of polyurethane catalysts may also be employed in the process of the present invention.

Any of the foam stabilizers or surfactants for cell stability or other cell size control agents normally used in the preparation of polyurethane foams can be used in the present invention. The foam stabilizers, surfactants for cell stability or other cell control agents are used in amounts well known to skilled persons. Mixtures of one one or more stabilizers and/or one or more surfactants may also be used. Suitable surfactants include the diverse silicone surfactants, preferably those which are block copolymers of a polysiloxane and a polyoxyalkylene as described in U.S. Pat. No. 3,629,308.

Known crosslinkers may also be used in the process of the invention to modify polyurethane foam properties. These crosslinkers are used in amounts well known to skilled persons.

In addition to the above mentioned materials, any number of a variety of additives conventionally used in the production of polyurethane foams such as, for example, fire retardants, defoamers, anti oxidants, mold release agents, dyes, pigments and fillers can also be used in the process of the present invention. These additives are used in amounts well known to skilled persons.

The following designations, symbols, terms and abbreviations are used in the Examples below:
CP-3040 is a glycerine started polyol having hydroxyl number in the range of 54 to 59 and Average Molecular Weight of 3,000 and viscosity at 25° C. of 490 cps, available from The Dow Chemical Company under the trademark VORANOL CP-3040.
CP-4702 is a glycerine started polyol having hydroxyl number in the range of 33–38 and Average Molecular Weight of 4,700 and viscosity at 25° C. of 820 cps, available from The Dow Chemical Company under the trademark VORANOL CP-4702.
DNC-635.04 is a sorbitol started polyol having hydroxyl number of 30 and Average Molecular Weight of 7000.
VTMSP vinyltrimethoxy silane modified precursor stabilizer prepared according to Example 3 of EP-0 162 589 B1.
Trigonox 27 is a free radical polymerization initiator sold by Akzo Chemie under the trademark TRIGONOX 27.
Vazo 67 is a 2,2'-Azobis(2-methylbutanenitrile) polymerization catalyst made by E. J. duPont de Nemours and Co.
Dabco 33LV a 33 percent solution of triethylene diamine in dipropylene glycol, sold by Air Products and Chemicals Inc. under the trademark DABCO 33LV.
Niax A-107 is a formic-acid-blocked version of 70% bis(2-dimethylaminoethyl)ether/30% dipropylene glycol amine catalyst available from Union Carbide Corp. under the trademark NIAX A-107.
DEOA is Diethanolamine.
DC-5164 is a silicone surfactant sold by Dow Corning Corporation.
IPA is isopropanol.
TDI-80 is a 80:20 mixture of the 2,4- and 2,6-toluene diisocyanate isomers sold by the Dow Chemical Company under the trademark Voranate T80.
Index is the ratio of the amount of reactive isocyanate groups in the reaction mixture divided by the amount of active hydrogen groups in the reaction mixture multiplied by 100.
STN is Styrene.
ACN is Acrylonitrile.

Properties of the polymer polyol composition and polyurethane foams given in the Examples below are determined according to the following test methods:
Air Flow (cfm) is measured according to the ISO 7231 test method (on AMSCOR foam porosity instrument).
Density is measured according to the DIN 53420 test method.
CFD 40% (kPa) is Compression Force Deflection determined according to DIN 53577.
IFD 25% (N) is Indentation Force Deflection 25% determined according to ASTM D-3574, Test B1 and B2.
IFD 40% (N) is Indentation Force Deflection 40% determined according to ASTM D-3574, Test B1 and B2.
IFD 65% (N) is Indentation Force Deflection 65% determined according to ASTM D-3574, Test B1 and B2.
SAG factor is Indentation Force Deflection 65% divided by Indentation Force Deflection 25%.
Tensile Strength (kPa) is determined in accordance with ASTM D-3574.
Elongation (%) is determined in accordance with ASTM D-3574, Test E.
Tear Strength (N/m) is determined in accordance with ASTM D-3574.
Filterability is Filtration Hindrance determined by diluting one part by weight sample (e.g. 470 g) of polymer polyol with two parts by weight anhydruous isopropanol (e.g. 960 g) to remove any viscosity-imposed limitations and using a fixed quantity of material in relation to fixed cros-sectional area of screen, such that all of the polymer polyol and isopropanol solution passes by gravity through a 150-mesh or 700-mesh screen. The 150-mesh screen has a square mesh with average mesh opening of 105 microns and is a "Standard Tyler" 150 square-mesh screen. The 700-mesh screen is made with a Dutch twill weave. The actual screen used had a nominal opening of 30 microns. The amount of sample which passes through the screen within 3000 seconds is reported as percent, a value of 100 percent indicates that over 99 weight percent passed through the screen
Viscosity is measured using a Brookfield viscometer, spindle # LVVT3, speed 12, in accordance with ASTM D-4874.

The following examples are given to illustrate the invention and should not be interpreted as limiting it in any way. Unless stated otherwise, all parts and percentages are given by weight.

EXAMPLES 1 AND 2

Preparation of Preformed Stabilizer

The preformed stabilizer was prepared in a continuous polymerization reactor empolying a tank reactor fitted with baffles and impeller. The feed components were pumped into the reactor continuously after going through an in line mixer to assure complete mixing of the feed components before entering the reactor. The contents of the reactor were well mixed. The internal temperature of the reactor was controlled to within 1° C. The product flowed out the top of the reactor and into a second unagitated reactor also controlled within 1° C. The product then flowed out the top of the second reactor continuously through a back pressure regulator that had been adjusted to maintain at least 65 psig pressure on both reactors. The preformed stabilizer then flowed through a cooler into a collection container. The preformed stabilizer feed compositions are shown in Table 1 below.

TABLE 1

| Example | | 1 | 2 |
|---|---|---|---|
| Formulation: | | | |
| CP-4702 | parts | 45.8 | 0 |
| DNC 635.04 | parts | 0 | 81.8 |
| VTMSP | parts | 46.0 | 10.0 |
| Trigonox 27 | parts | 0.2 | 0.2 |
| STY | parts | 5.6 | 5.6 |
| ACN | parts | 2.4 | 2.4 |

EXAMPLES 3 TO 9

Preparation of Polymer Polyol Composition

The polymer polyol of the present invention was prepared using a continuous polymerization system, using a tank reactor fitted with baffles and impeller. In Examples 3 to 4 and 6 to 9, the polymer polyol composition feed components were pumped into the reactor continuously after going through an in line mixer to assure complete mixing of the feed components before entering the reactor. The contents of the reactor were well mixed. The internal temperature of the reactor was controlled to within 1° C. The product flowed out the top of the reactor and into a second unagitated reactor also controlled within 1° C. The product then flowed out the top of the second reactor continuously through a back pressure regulator that had been adjusted to give about 45 psig pressure on both reactors. The crude polymer polyol product then flowed through a cooler into a collection vessel. Percent by weight polymer in the polymer polyol was determined from analysis of the amount of unreacted monomers present in the crude product. The crude product was vacuum stripped to remove volatiles before testing. The polymer polyol in Example 5 was prepared by the same procedure as used in Examples 3 to 4 and 6 to 9 except that the preformed stabilizer was continuouslyfed into the polymer polyol forming reactor from the reactor it was prepared in while the rest of the polymer polyol composition feed was pumped into the same reactor. All the polymer polyols produced were stable compositions. The polymer polyol feed compositions, preparation conditions and polymer polyol properties are shown in Table 2 below.

TABLE 2

| Example | | 3 | 4 | 5 | 6 | 7 | 8 | 9 |
|---|---|---|---|---|---|---|---|---|
| Formulation: | | | | | | | | |
| CP-4702 | parts | 50.6 | 48.3 | 50.3 | 0 | 44.3 | 49.8 | 50.6 |
| CP-3040 | parts | 0 | 0 | 0 | 51.6 | 0 | 0 | 0 |
| Preformed Stabilizer of Ex. 1 | parts | 3.8 | 3.3 | 3.8 | 3.8 | 6.6 | 4.3 | 0 |
| Preformed Stabilizer of Ex. 2 | parts | 0 | 0 | 0 | 0 | 0 | 0 | 3.8 |
| Vazo 67 | parts | 0.4 | 0.4 | 0.4 | 0.4 | 0.4 | 0.41 | 0.41 |
| STY | parts | 24.3 | 26.0 | 24.5 | 28.9 | 24.2 | 24.5 | 24.3 |
| ACN | parts | 16.2 | 17.3 | 16.3 | 12.4 | 19.8 | 16.3 | 16.2 |
| IPA | parts | 4.7 | 4.7 | 4.7 | 2.9 | 4.7 | 4.7 | 4.7 |
| Prep. Conditions | | | | | | | | |
| React. Temp. | ° C. | 125 | 125 | 125 | 125 | 115 | 115 | 125 |
| Monomer in total feed | wt % | 40.5 | 43.3 | 40.8 | 41.3 | 44 | 40.8 | 40.5 |
| Ratio ACN/STY | | 40/60 | 40/60 | 40/60 | 30/70 | 45/55 | 40/60 | 40/60 |
| Residual STY | parts | 0.22 | 0.22 | 1.3 | 1.12 | 0.10 | 0.3 | 0.2 |
| Residual ACN | parts | 0.78 | 0.76 | 1.64 | 0.52 | 0.30 | 0.9 | 0.8 |
| Total polymer | wt % | 42.2 | 45.2 | 40.6 | 41.8 | 45.9 | 41.7 | 41.4 |
| Product Properties | | | | | | | | |
| Viscosity | cps | 5550 | 6800 | 4950 | 3280 | 8780 | 6180 | 5200 |
| Filterability: | | | | | | | | |
| 150-mesh | % | 100 | 100 | 100 | 100 | 100 | 100 | 100 |
| 700-mesh | % | 100 | 100 | 100 | 100 | 100 | 100 | 100 |

EXAMPLES 10 TO 11

Preparation of Polyurethane Foams

Polyurethane foams were produced by pouring foam formulations shown in Table 3 below into an aluminum, 16 liter (40×40×10 cm), 4 vent holes mould heated to a temperature of about 60° C. using Admiral high pressure pouring machine DHF-I and Krauss Maffei MK12-12/16-UL-2K Duplex mixing head and allowing the foam to rise and curing. The foam demould time was 5 minutes. Klüber 918/9K mould release agent (sold by Klüber AG) was used as the mould release agent. The polyol component/ isocyanate component tanks pressure was 3 bars. Both the polyol component and isocyanate components were dispensed at about 150 bars pressure. Polymer Polyol A used in the foam formulation shown in Table 3 below is the polymer polyol produced in Example 3 herein, diluted with CP-4702 base polyol. Polymer Polyol A has viscosity (at 25° C.) of 3,000 cps and a solids content of 28 weight percent. Polymer Polyol B used in the foam formulation shown in Table 3 below is the polymer polyol produced in Example 3 herein, diluted with CP-4702 base polyol. Polymer Polyol B has viscosity (at 25° C.) of 3,400 cps and a solids content of 33 weight percent. Foam formulations and foam properties are shown in Table 3 below. As can be seen from Table 3 below, polyurethane foams prepared in Examples 10 and 11 using a the polymer polyol of the present invention exhibit high load-bearing characteristics without any significant loss in other physical characteristics.

TABLE 3

| Example | | 10 | 11 |
|---|---|---|---|
| Polyol Component: | | | |
| Copolymer Polyol A | parts | 100 | 0 |
| Copolymer Polyol B | | 0 | 100 |
| water | parts | 3.6 | 3.6 |
| DEOA (100%) | parts | 1.6 | 1.6 |
| Niax A-107 | parts | 0.2 | 0.2 |
| Dabco 33LV | parts | 0.2 | 0.2 |
| DC-5164 | parts | 1.1 | 1.1 |
| Isocyanate Component | | | |
| TDI-80 | Index | 80 | 80 |
| Foam Properties: | | | |
| Core Density | kg/m$^3$ | 35.4 | 34.8 |
| C.F.D 40% | kPa | 4.11 | 4.86 |
| I.F.D. 25% | N | 127 | 156 |
| I.F.D. 40% | N | 207 | 251 |
| I.F.D. 65% | N | 449 | 556 |
| I.F.D. 65%/I.F.D. 25% | | 11.61 | 13.96 |
| Tensile Strength | kPa | 181 | 166 |
| Elongation | % | 116 | 99 |
| Tear Strength | N/m | 328 | 348 |

I claim:

1. A polymer polyol composition which has a polymer content of 30 to 60 weight percent, based on total weight, a viscosity in centipoise of not more than 9,000 and product stability such that essentially 100% passes through a 150 mesh screen and essentially 100% passes through a 700 mesh screen produced by a free radical polymerization of the composition comprising:

(a) a polyol;
   (b) a preformed stabilizer comprising the reaction product of (i) a polyol; (ii) a precursor stabilizer obtainable by reacting a silicon atom containing compound of formula $R_nSiX_{4-n}$ or $R_nSi((-OSi(R^1)_2)_pX)_{4-n}$ wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with a polyether polyol having an average molecular weight in excess of 400 and a hydroxyl number in the range 20 to 280; (iii) at least one ethylenically unsaturated monomer which is copolymerizable with the precursor stabilizer; and (iv) a free radical polymerization initiator;
   (c) at least one ethylenically unsaturated monomer;
   (d) a free radical polymerization initiator; and, optionally,
   (e) a chain transfer agent.

2. The polymer polyol composition as claimed in claim 1 wherein the at least one ethylenically unsaturated monomer in (b)(iii) or (c) is a mixture of acrylonitrile and styrene.

3. A polymer polyol composition as claimed in claim 2, wherein acrylonitrile and styrene are present in the mixture in the ratio of from 20:80 to 80:20.

4. A process for the preparation of polymer polyol composition which process comprises providing a composition comprising:

(a) a polyol;
   (b) a preformed stabilizer comprising the reaction product of (i) a polyol; (ii) a precursor stabilizer obtainable by reacting a silicon atom containing compound of formula $R_nSiX_{4-n}$ or $R_nSi((-OSi(R^1)_2)_pX)_{4-n}$ wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with a polyether polyol having an average molecular weight in excess of 400 and a hydroxyl number in the range 20 to 280; (iii) at least one ethylenically unsaturated monomer which is copolymerizable with the precursor stabilizer; and (iv) a free radical polymerization initiator;
   (c) at least one ethylenically unsaturated monomer;
   (d) a free radical polymerization initiator; and, optionally,
   (e) a chain transfer agent in a reaction zone maintained at a temperature sufficient to initiate a free radical polymerization, and under sufficient pressure to maintain only liquid phases in the reaction zone, for a period of time sufficient to react essentially at least major portion of the at least one ethylenically unsaturated monomer and recovering the polymer polyol.

5. A process according to claim 4, wherein the reaction zone is maintained at the temperature of from 80° C. to 150° C.

6. A composition for the preparation of a polyurethane foam comprising a polymer polyol, a polyurethane catalyst, an organic polyisocyanate, a surfactant, and a blowing agent, characterized in that the polymer polyol comprises polymer polyol as claimed in claim 1.

7. A polyurethane foam prepared from a composition as claimed in claim 6.

8. A polyurethane foam prepared from a polymer polyol composition as claimed in claim 1.

* * * * *